UNITED STATES PATENT OFFICE.

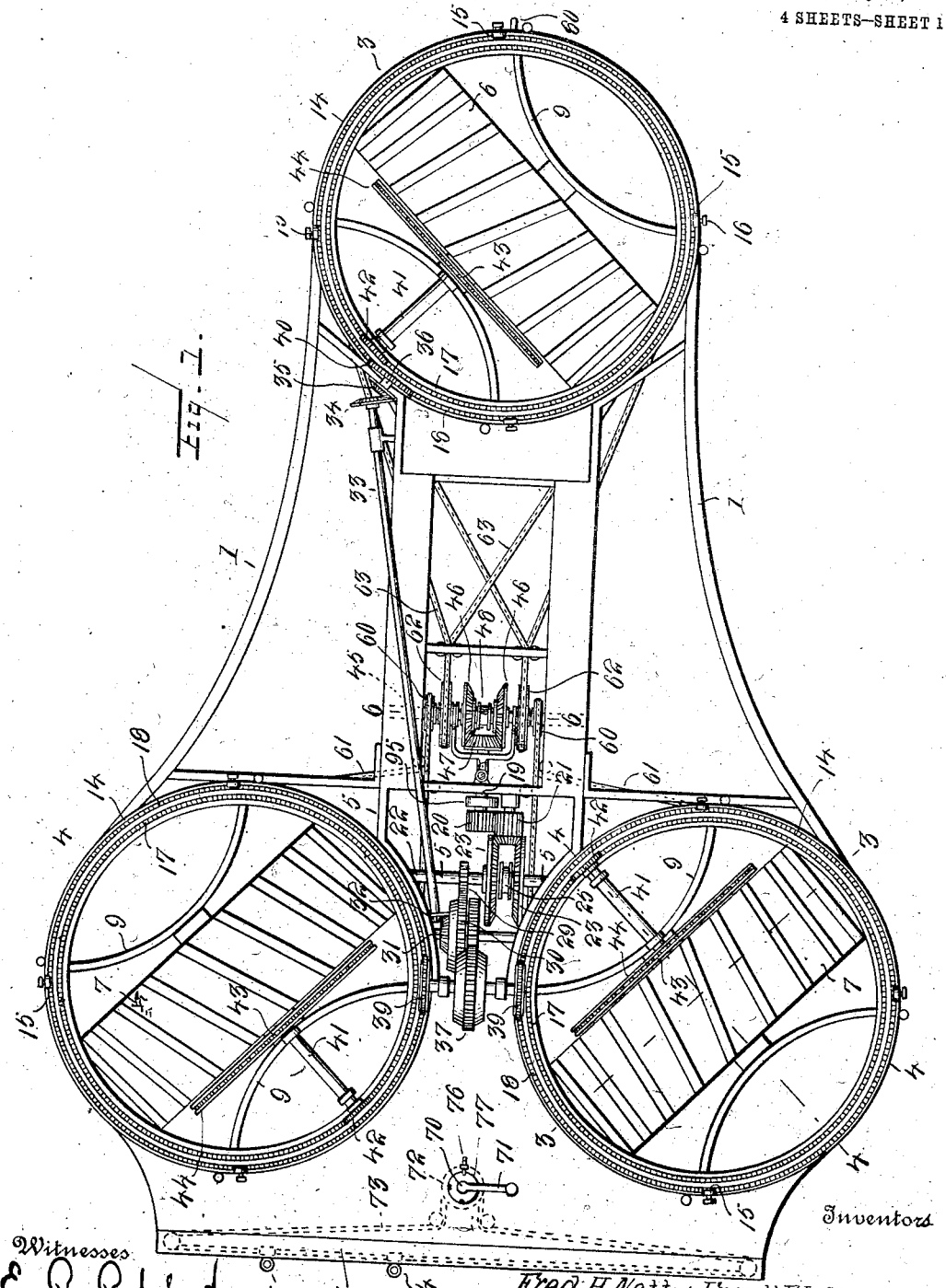

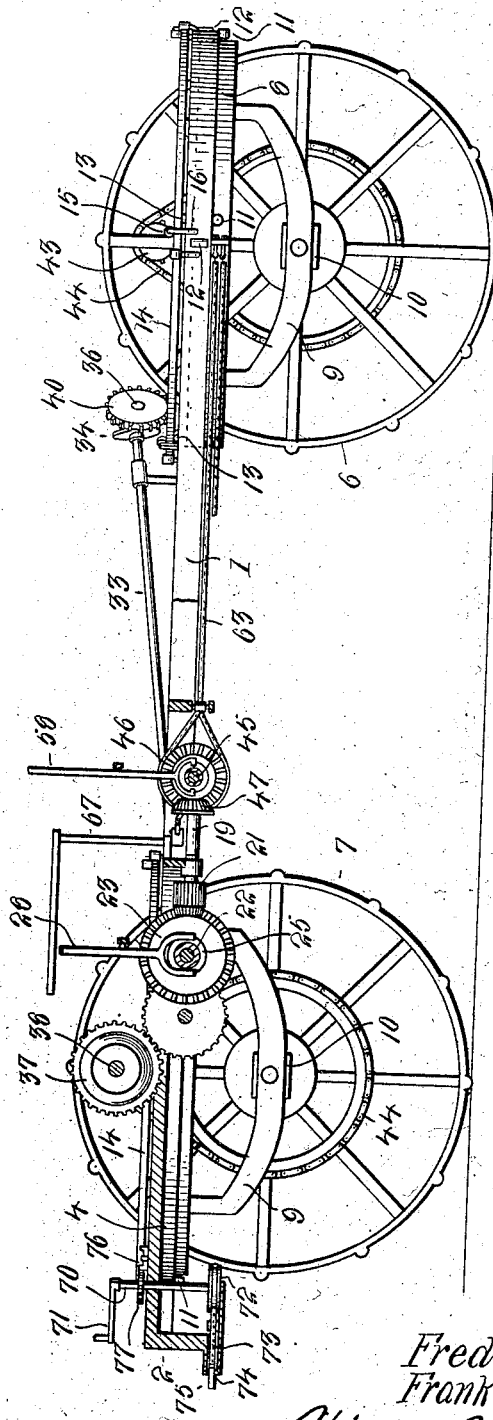

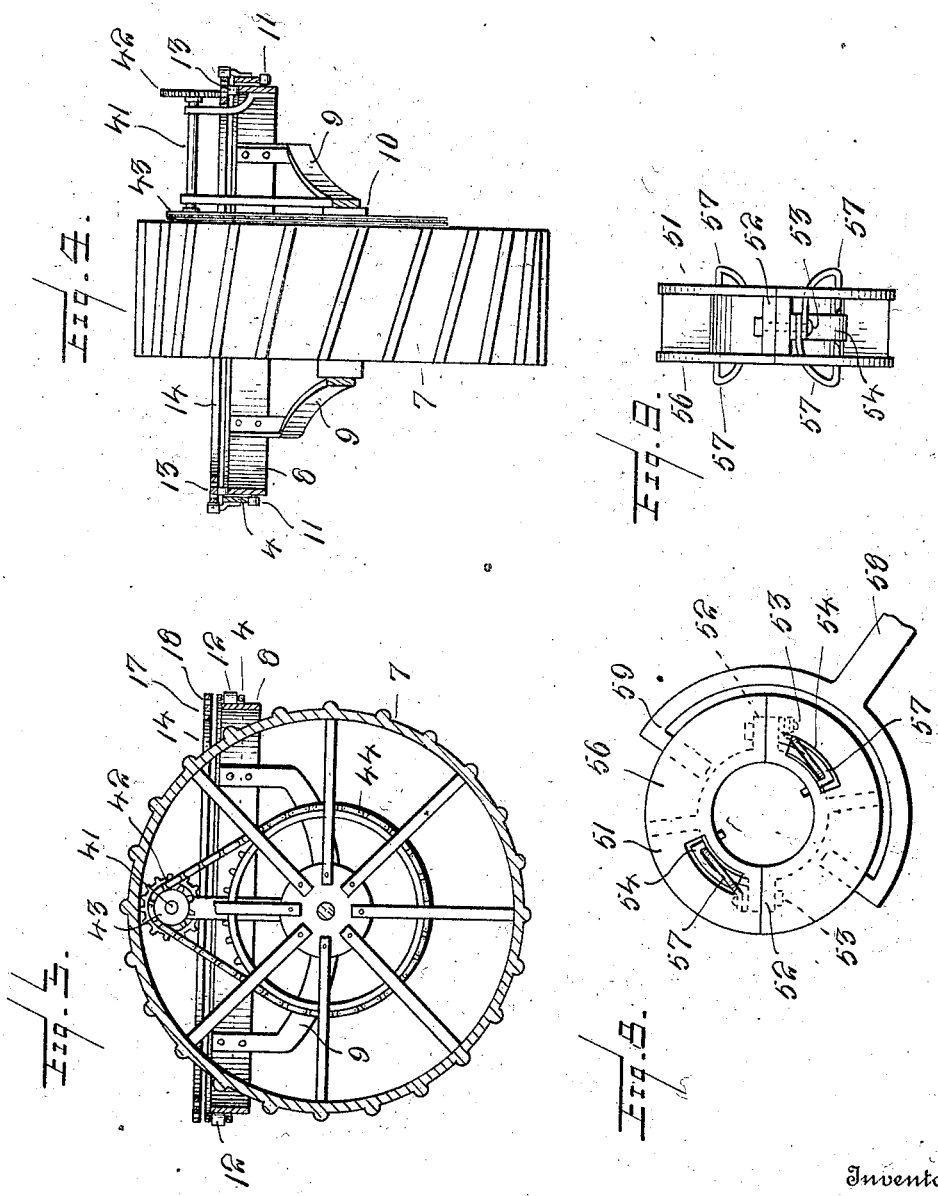

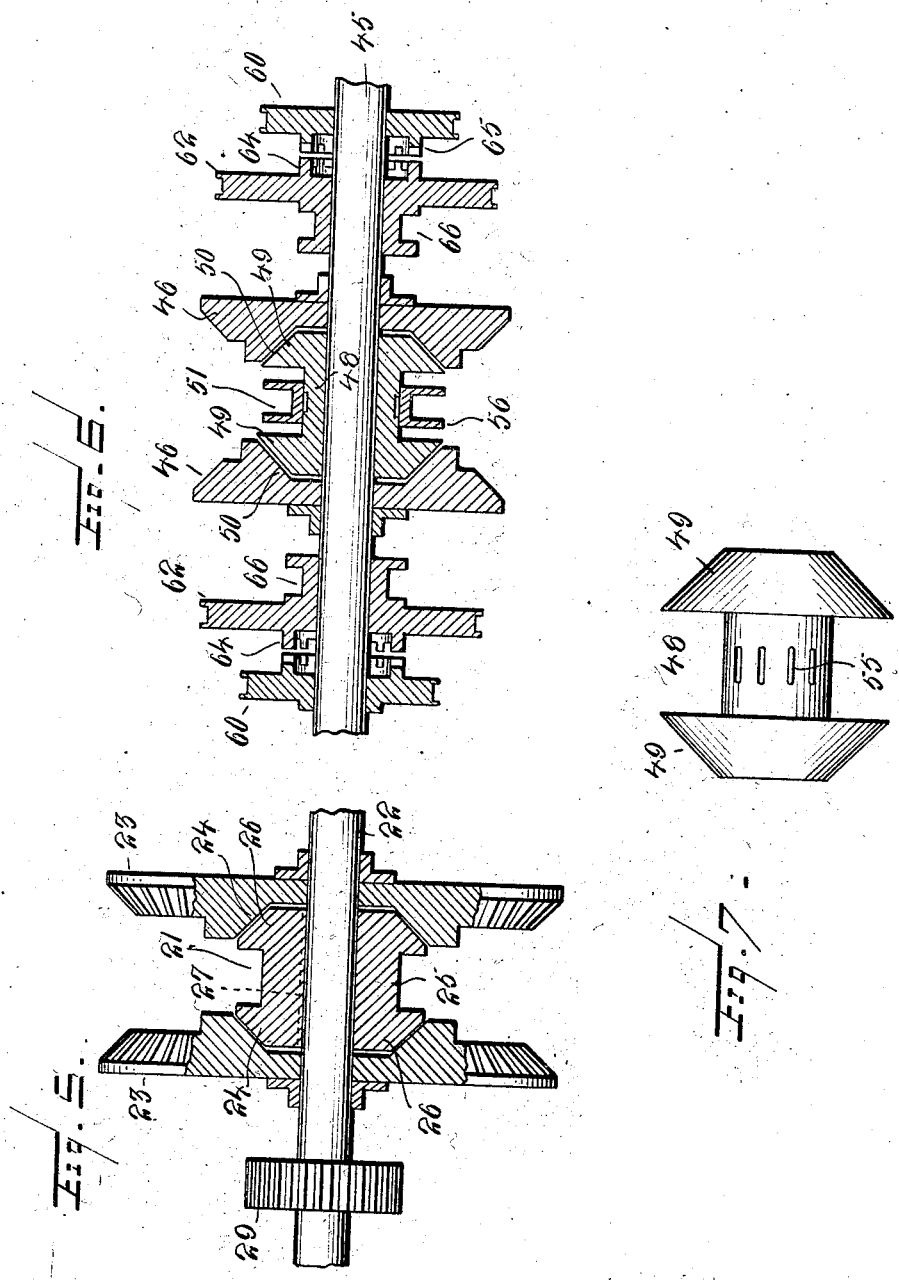

FRED H. NETT AND FRANK W. NETT, OF RIALTO, CALIFORNIA.

TRACTION-ENGINE.

1,061,104. Specification of Letters Patent. Patented May 6, 1913.

Application filed September 20, 1911. Serial No. 650,328.

*To all whom it may concern:*

Be it known that we, FRED H. NETT and FRANK W. NETT, citizens of the United States, residing at Rialto, in the county of San Bernardino and State of California, have invented new and useful Improvements in Traction-Engines, of which the following is a specification.

This invention relates to traction engines, and the principal object of the invention is to produce a traction engine which shall be especially adapted for work that requires short turning, such as orchard work, pulling mowing machines, plows and other agricultural implements, pushing headers and the like.

A further object of the invention is to produce a simple and efficient traction engine supported upon three wheels, all of which are driven.

A further object of the invention is to simplify and improve the transmission of motion from the engine or motor to the transporting wheels.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view showing the frame of a traction engine constructed in accordance with the invention, and illustrating the power transmission mechanism and the steering mechanism. Fig. 2 is a side elevation, partly in section. Fig. 3 is a vertical sectional view taken on the line 3—3 in Fig. 1. Fig. 4 is a vertical sectional view taken on the line 4—4 in Fig. 1. Fig. 5 is a sectional view, enlarged, taken on the line 5—5 in Fig. 1. Fig. 6 is a sectional view, enlarged, taken on the line 6—6 in Fig. 1. Fig. 7 is a detail plan view of the cone pulley forming part of the clutch used in connection with the steering mechanism. Fig. 8 is a side elevation of the grooved pulley used in connection with the cone pulley illustrated in Fig. 7. Fig. 9 is an edge view of the grooved pulley illustrated in Fig. 8.

Corresponding parts in the several figures are denoted by like characters of reference.

The frame structure of the improved traction engine is preferably made of angle iron, and said frame structure includes side members 1, 1, a rear member or cross bar 2, a circular front track 3 and circular rear tracks 4, 4, said circular front and rear tracks being securely connected with the side members of the frame structure by means including brackets 5. The frame structure is suitably braced and reinforced, as best seen in Fig. 1.

A front wheel 6 and rear wheels 7, 7 are provided to support the frame structure, and as these front and rear wheels are in all essential particulars of identical construction, the same reference characters will be used to designate the parts associated with said wheels.

For each of the wheels 6 and 7, 7 a circular supporting frame 8 is provided, said supporting frame having oppositely disposed downwardly extending yokes 9 equipped with bearing boxes 10 wherein the axles of the wheels are journaled. The circular wheel carrying frames 8 are accommodated in the circular tracks 3 and 4, 4 of the main frame structure and are capable of rotating therein, said frames constituting turn tables, as will be readily understood. The frames or turn tables 8 are provided with anti-friction means, such as rollers 11 supporting the lower edges of the track members 3 and 4, and said track members are provided with vertically disposed rollers 12 upon their inner faces to facilitate the turning of the frames or turn tables 8 and to prevent them from binding.

Each of the circular tracks 3 and 4 is provided adjacent to its upper edge with antifriction rollers 13 supporting an annular gear ring 14 which is held securely in position by means of overhanging rollers 15 supported by means of brackets 16 rising from the respective tracks. Each of the rings 14 is provided with two circumferential series of notches 17 and 18 adapted to be engaged by and to coöperate with toothed wheels, as will be presently more fully described for the purpose of assisting in transmitting rotary motion to the transporting wheels.

19 designates a motor driven shaft which is provided at one end with a pinion 20 meshing with a gear wheel 21 which is suitably supported for rotation adjacent thereto. A transversely arranged shaft 22 supports a pair of gear wheels 23, each provided in the face thereof with a recess 24. The gear wheels 23 are mounted loosely upon the shaft 22, and the latter supports between said gear wheels a sleeve 25 having terminal friction cones 26 adapted to engage the recesses 24 in the faces of the proximate gear wheels. The sleeve 25 is slidably mounted upon the shaft with which it is connected for rotation by means of a key or spline 27. A shipping lever 28, which may be fulcrumed in any suitable location, engages the clutch member composed of the sleeve 25 and the friction cones 26 for the purpose of shifting the latter, so as to engage either one of the gear wheels 23. The latter, it will be seen, are constantly rotated in opposite directions by means of the gear wheel 21, and it follows that by placing the friction clutch in engagement with one of the gear wheels 23, the shaft 22 will be rotated in one direction, while by placing the friction clutch in engagement with the other gear wheel 23, the shaft 22 will be rotated in the opposite direction.

The shaft 22 carries a pinion 29 driving a differential gear 30 having associated therewith a bevel gear 31 meshing with a bevel gear 32 upon the rear of a shaft 33 having at its front end a bevel gear 34 meshing with a bevel gear 35 upon a stub shaft 36 which is supported for rotation upon the circular track 3. The differential gear 30 thus distributes equal power to the shaft 33 and to a second differential gear 37, the stub shafts of which, 38, carry gear wheels 39 meshing with the outer series of notches 18 in the gear rings 14 supported upon the rear circular tracks 4 of the frame structure. In like manner, the stub shaft 36 carries a gear wheel 40 meshing with the outer series of notches 18 in the gear ring supported upon the front circular track 3.

Each of the turn tables 8 is provided with bearings for a shaft 41 having at one end a gear wheel 42 meshing with the inner series of notches 17 in the gear ring associated with the circular track supported for such turn table, and each of the shafts 41 is provided at its opposite end with a sprocket wheel 43 which is connected by a transmission chain 44 with the sprocket wheel associated with the transporting wheel 6 or 7, as the case may be, which is journaled upon the yoke 9 of such turn table.

It will be seen that by the construction and arrangement of parts above described, motion is transmitted from the shaft 19 to the shaft 22, the direction of rotation of which may be reversed by shifting the clutch member including the sleeve 25. From the shaft 22 motion is transmitted to the differential gear 37 by means including the differential gear 30, whereby equal power is distributed to the differential gear 37 and to the shaft 33. The latter transmits rotary motion to the gear ring 14 associated with the front supporting wheel 6, and the differential gear 37 distributes equal power to the gear rings associated with the rear transporting wheels 7, said wheels 6 and 7 being rotated by power transmitted from the gear rings 14 through the gear wheels 42 upon the shafts 41 and the sprocket wheels 43 upon the said shafts, said sprocket wheels being connected with the transporting wheels by ordinary chain transmission. It is obvious that ordinary gearing may be substituted for the chain transmission when preferred.

It will be readily seen that by the mechanism described, the several transporting wheels will be rotated in the same direction, and that the direction of rotation may be very quickly reversed by simply shifting the position of the clutch sleeve 25. The latter may be held at a position intermediate the gear wheels 23, and the latter will thus rotate idly upon the shaft 22. It will, of course, be understood that any suitable and well known means may be employed to prevent displacement of the gear wheels 23 longitudinally of the shaft 22. A suitably supported shaft 45 is provided with loose gear wheels 46 meshing with a pinion 47 upon the driven shaft 19. The shaft 45 also carries a clutch member consisting of a hub 48 having friction cones 49 adapted to engage conical recesses 50 in the faces of the gear wheels 45. The hub 48 supports a two-part diametrically divided sleeve 51 having meeting flanges 52 which are apertured for the passage of connecting bolts 53. The bolts 53 also serve for the attachment of resilient hook-shaped pawls 54 which operate through slots in the sleeve 51 to engage notches or recesses 55 in the hub 48. The sleeve 51 is provided with annular end flanges 56 which are apertured for the passage of resilient dogs 57 which are also mounted upon the bolts 51, said resilient dogs being curved, as shown, so that their free ends will be adapted to engage beneath the pawls 54 for the purpose of lifting or releasing the latter from engagement with the notches 55. The curved resilient dogs 57 project through and beyond the flanges 56 at the two ends of the sleeve 51 so as to normally engage the bases of the friction cones 49, thereby maintaining the sleeve 51 normally about equidistantly between said friction cones and with the pawls 54 in engagement with the notches 55, thereby locking the clutch member including the hub 48 and the shaft 45 against accidental rotation. A shipping lever 58 of ordinary bifurcated type is provided, said shipping lever being provided with terminal lugs 59 engaging between the terminal flanges 56 of the sleeve 51, and lying in the path of the meeting flanges 52, thereby obstructing rotation of the sleeve. It will be seen that by manipulating the shipping lever, the sleeve may be moved in either direction upon the shaft 45 to place one of the friction cones 49 in engagement with one of the gear wheels 46. When the sleeve 51 is shifted by the shipping lever, the resilient dogs 57 projecting through the flange at one end of the sleeve will be engaged by the base of one of the friction cones, thereby pressing such pawl beneath the resilient dog 54 and disengaging the latter from the notch 55 in the clutch member, which latter is thus released and permitted to revolve. It will be understood that the gear wheels 46 are driven in opposite directions by the pinion 47 upon the shaft 19. Hence, it is obvious that the shaft 45 may be rotated in either direction by causing the slidable clutch member to engage one or the other of the gear wheels 46. Any suitable and well known means may be provided to secure the gear wheels 46 against displacement longitudinally of the shaft 45.

The shaft 45 is provided adjacent to the ends thereof with fixed pulleys 60 of the chain carrying type, said pulleys being connected by suitably guided chains 61 with the turn tables carrying the rear transporting wheels 7, said chains 61 being guided in such a manner that by the rotation of the shaft 45, the two turn tables will be simultaneously turned in the same direction so as to maintain the rear supporting wheels 7 in substantially parallel relation. Slidably supported upon the shaft 45 adjacent to the pulleys 60 are chain carrying pulleys 62 of larger diameter, and suitably guided chains 63 connect said pulleys with the turn table associated with the front transporting wheel 6. The pulleys 62 are loosely supported upon the shaft 45, but are provided on their outer faces with clutch members 64 adapted to engage clutch members 65 upon the inner faces of the pulleys 60. The hubs of the pulleys 62 are provided with annular grooves 66 adapted to be engaged by a suitably supported double shipping lever 67, whereby the pulleys 62 may be simultaneously moved longitudinally of the shaft 45 so as to place the clutch members associated with one or the other of said pulleys in engagement with the clutch members associated with one or the other of the pulleys 60, thereby locking one of the pulleys 62 for rotation with the shaft 45, while the other pulley 62 remains idle.

When it is desired to turn the traction engine or to guide the same either to the right or to the left, the double shipping lever 67 is first actuated to place one of the pulleys 62 in engagement with the adjacent pulley 60. While this is accomplished the shaft 45 remains stationary. The shipping lever 58 is now actuated to move the sleeve 51 and the clutch member including the hub 48 in the proper direction, thereby first releasing the pawls 54 from the notches 55, and next placing one of the friction cones 49 in engagement with the proper gear wheel 46, causing motion to be transmitted from such gear wheel to the shaft 45 which, being rotated, will cause the turn tables to be turned in the proper direction to steer the vehicle as may be desired.

Associated with the cross bar 2 at the rear end of the frame structure is a vertical shaft 70 having an operating crank 71 and a chain wheel 72, the latter being connected by a suitably guided chain 73 with slides 74 supported in a suitable groove in the rear face of the cross bar 2 and having rings or clevises 75 to which a plow or other agricultural machine may be hitched. Suitable means, such as an ordinary lock dog 76 may be provided to engage the gear wheel 77 upon the shaft 70 for the purpose of securing the latter and the parts actuated thereby in adjusted position. A link or clevis 80 is also mounted at the front end of the frame for the purpose of coupling the same with machinery or rolling stock that is to be moved by means of the traction engine.

The main driven shaft 19 may, when desired, be provided with a band wheel 95 for the purpose of enabling motion to be transmitted to stationary machinery.

From the foregoing description, taken in connection with the drawings hereto annexed, the operation and advantages of this invention will be understood by those skilled in the art to which it appertains. The construction of the improved traction engine is simple and inexpensive. The steering gear is operated by power derived from the motor by which the machine is propelled. It will, furthermore, be observed that motion will be constantly transmitted to each of the supporting wheels without regard to the position occupied by said wheels.

Having thus described the invention, what is claimed as new, is:—

1. In a traction engine, a frame having circular tracks, turn tables supported for rotation with reference to said tracks, transporting wheels associated with the turn tables, gear rings supported for rotation upon the circular tracks, a driven shaft, means for transmitting motion from the shaft to the gear rings, and means for transmitting motion from the gear rings to the transporting wheels.

2. In a traction engine, a frame structure having circular tracks, turn tables associated therewith, traction wheels carried by the turn tables, a driven shaft, and means for transmitting motion from the driven shaft to the traction wheels including gear members supported for rotation upon the turn tables concentrically with the latter, shafts supported for rotation upon the turn tables and having spur wheels meshing with said gear members, and transmission means connecting said shafts with the traction wheels.

3. In a traction engine, a frame structure including a circular track at the front end thereof and two circular tracks at the rear end thereof, turn tables supported for rotation with reference to said tracks, traction wheels associated with the turn tables, gear rings supported for rotation upon the turn tables, means for transmitting motion from the gear rings to the traction wheels, a longitudinal shaft, a stub shaft supported for rotation upon the circular track at the front end of the frame and having a pinion meshing with the gear ring on said track, bevel gearing connecting the stub shaft with the longitudinal shaft, a motor driven shaft, a transverse shaft, means for transmitting motion from the motor driven shaft to the transverse shaft and for reversing such motion, a differential gear having stub shafts provided with spur wheels engaging the gear rings supported upon the rear circular tracks, means including a second differential gear for transmitting motion from the transverse shaft to the differential gear having the stub shafts, and bevel gearing transmitting motion from the second differential gear to the longitudinal shaft.

In testimony whereof we affix our signatures in presence of two witnesses.

FRED H. NETT.
FRANK W. NETT.

Witnesses:
FRANK T. BATES,
RAYMOND E. HODGE.